United States Patent [19]

Fujii

[11] Patent Number: 4,878,358

[45] Date of Patent: Nov. 7, 1989

[54] DEMISTING CONTROL SYSTEM OF AIR CONDITIONER FOR AUTOMOTIVE VEHICLES

[75] Inventor: Kazuo Fujii, Konan, Japan

[73] Assignee: Diesel Kiki Co., Ltd., Tokyo, Japan

[21] Appl. No.: 213,165

[22] Filed: Jun. 29, 1988

[30] Foreign Application Priority Data

Dec. 1, 1987 [JP] Japan ................... 62-305375

[51] Int. Cl.$^4$ ............................................. F25B 1/00
[52] U.S. Cl. ........................................ 62/227; 62/157; 62/228.5; 62/244
[58] Field of Search .................. 62/228.1, 228.3, 228.4, 62/228.5, 229, 227, 231, 234, 244, 157, 151, 155, 156, 150, 161, 163; 236/47, 46 R, 46 F

[56] References Cited

U.S. PATENT DOCUMENTS

| | | | |
|---|---|---|---|
| 4,412,424 | 11/1983 | Iida et al. | 62/227 X |
| 4,448,034 | 5/1984 | Shimada et al. | 62/244 X |
| 4,685,508 | 8/1987 | Ida | 62/227 X |
| 4,706,467 | 11/1987 | Thorsen et al. | 62/157 X |
| 4,709,751 | 12/1987 | Ichimara et al. | 62/244 X |
| 4,783,970 | 11/1988 | Takahashi | 62/244 X |

FOREIGN PATENT DOCUMENTS 0054563 11/1985 Japan.

Primary Examiner—Harry B. Tanner
Attorney, Agent, or Firm—Charles S. McGuire

[57] ABSTRACT

A demisting control system of an air conditioner for automotive vehicles, which comprises an evaporator, and a variable capacity compressor capable of being controlled in capacity from the outside. An actual cooling degree of the evaporator is detected. At least two desired cooling degrees of the evaporator are set. The detected actual cooling degree and each of the set at least two desired cooling degrees are compared with each other. On the basis of the comparison results, a value of the capacity to which the compressor is to be controlled is determined. The at least two desired cooling degrees are selected one by one in predetermined sequence and each selected desired cooling degree is compared with the actual cooling degree as above for a predetermined time period exclusively provided therefor. The compressor is driven so that its capacity is brought to the value of capacity determined as above.

6 Claims, 3 Drawing Sheets

DEMISTING CONTROL SYSTEM OF AIR CONDITIONER FOR AUTOMOTIVE VEHICLES

BACKGROUND OF THE INVENTION

The present invention relates to a demisting control system of an air conditioner installed on automotive vehicles or the like.

A cooling air conditioner has been known, e.g. from Japanese Patent Publication (Kokoku) No. 60-54563, in which air temperature in a space to be cooled is compared with a predetermined cooling start temperature and a predetermined cooling stop temperature, and the operation of a compressor is controlled in an ON- and OFF-manner in accordance with the comparison results, so as to maintain the temperature and humidity in the space within respective predetermined ranges satisfying comfortable conditions. The above-described cooling air conditioner has a control system which is operable such that in order to avoid that the compressor is continuously operated for a long period of time, the compressor is kept operative ("ON" operation) for a first predetermined period of time, and then kept inoperative ("OFF" operation) for a second predetermined period of time immediately following the first predetermined period of time, and thereafter these on and off operations are repeated, to thereby secure comfortableness within the space to be cooled and reduce the power energy consumed by the air conditioner.

When the above conventional control system is employed to remove mist on a window pane of the automotive vehicle, i.e., to demist the window pane, it is necessary to set the aforesaid predetermined cooling start and stop temperatures at respective values equal to or lower than the ambient or outdoor air temperature. The reason for this is that mist occurs on the window pane when cooling operation of the air conditioner is not carried out and when, in general, the outdoor air temperature is lower than the indoor air hr compartment temperature.

Accordingly, demisting of the window pane is carried out by heating the vehicle compartment, or by increasing the heating degree, to prevent the indoor air temperature from being lowered. As a consequence, however, the indoor air temperature does not readily reach the aforesaid predetermined cooling stop temperature. In the meantime, the first predetermined period of time elapses so that the compressor is switched to the "OFF" operation. However, the first predetermined period of time must be set at such a fixed value as to obtain comfortableness of the space to be cooled or vehicle compartment at cooling operation of the air conditioner. Therefore, the operation of the air conditioner in the vicinity of the predetermined cooling start and stop temperatures set at their respective values equal to or lower than the low outdoor air temperature enough not to necessitate cooling operation causes the evaporator to freeze hard by the time the first predetermined period of time elapses, even if the predetermined cooling stop temperature is equal to or above 0 (zero) ° C.

SUMMARY OF THE INVENTION

It is an object of the invention to provide a demisting control system of an air conditioner for automotive vehicles, which is capable of controlling the operation of the compressor on the basis of the cooling degree of the evaporator so as to prevent freezing of the evaporator or restrain freezing of the evaporator as completely as possible.

It is a further object of the invention to provide a demisting control system of an air conditioner for automotive vehicles, which can improve oil-return ability of the compressor.

It is another object of the invention to provide a demisting control system of an air conditioner for automotive vehicles, which can enhance the degree of freedom of system design.

According to the invention, there is provided a demisting control system of an air conditioner for an automotive vehicle, the air conditioner including an evaporator, and a variable capacity compressor capable of being controlled in capacity from the outside, the demisting control system comprising:

detecting means for detecting an actual cooling degree of the evaporator;

setting means for setting at least two desired cooling degrees of the evaporator;

comparing means for comparing the actual cooling degree detected by the detecting means with each of the at least two desired cooling degrees set by the setting means, to output comparison results;

determining means for determining a value of capacity to which said compressor is to be controlled, on the basis of the comparison results from said comparing means;

capacity switching means for selecting one by one the at least two desired cooling degrees in predetermined sequence and supplying each of the selected cooling degrees to said comparing means for a predetermined time period exclusively provided for each selected cooling degree; and driving means for driving the compressor so that the capacity thereof is brought to the value of capacity determined by the determining means.

Preferably, at least one of the at least two desired cooling degrees is determined on the basis of outdoor air temperature.

Alternatively, each of the at least two desired cooling degrees is a fixed value.

The term "cooling degree" used in this specification means the degree to which the evaporator has been cooled (actual cooling degree) or the degree to which the evaporator is to be cooled (desired cooling degree). For example, the cooling degree may be the temperature T of refrigerant on the refrigerant inflow side of the evaporator or the temperature of fins, tubes or the like constituting the evaporator.

Thus, for example, when the cooling degree is described as high, it means that the above-mentioned temperature T is low.

The above and other objects, features and advantages of the invention will become more apparent from the ensuing detailed description taken in conjunction with the accompanying drawings.

BRIEF DESCRIPTION OF THE DRAWINGS

FIG. 4 is a flowchart showing the control steps executed by a demisting control system according to a second embodiment of the invention.

DETAILED DESCRIPTION

The invention will be described in detail with reference to the drawings.

Figure 1:
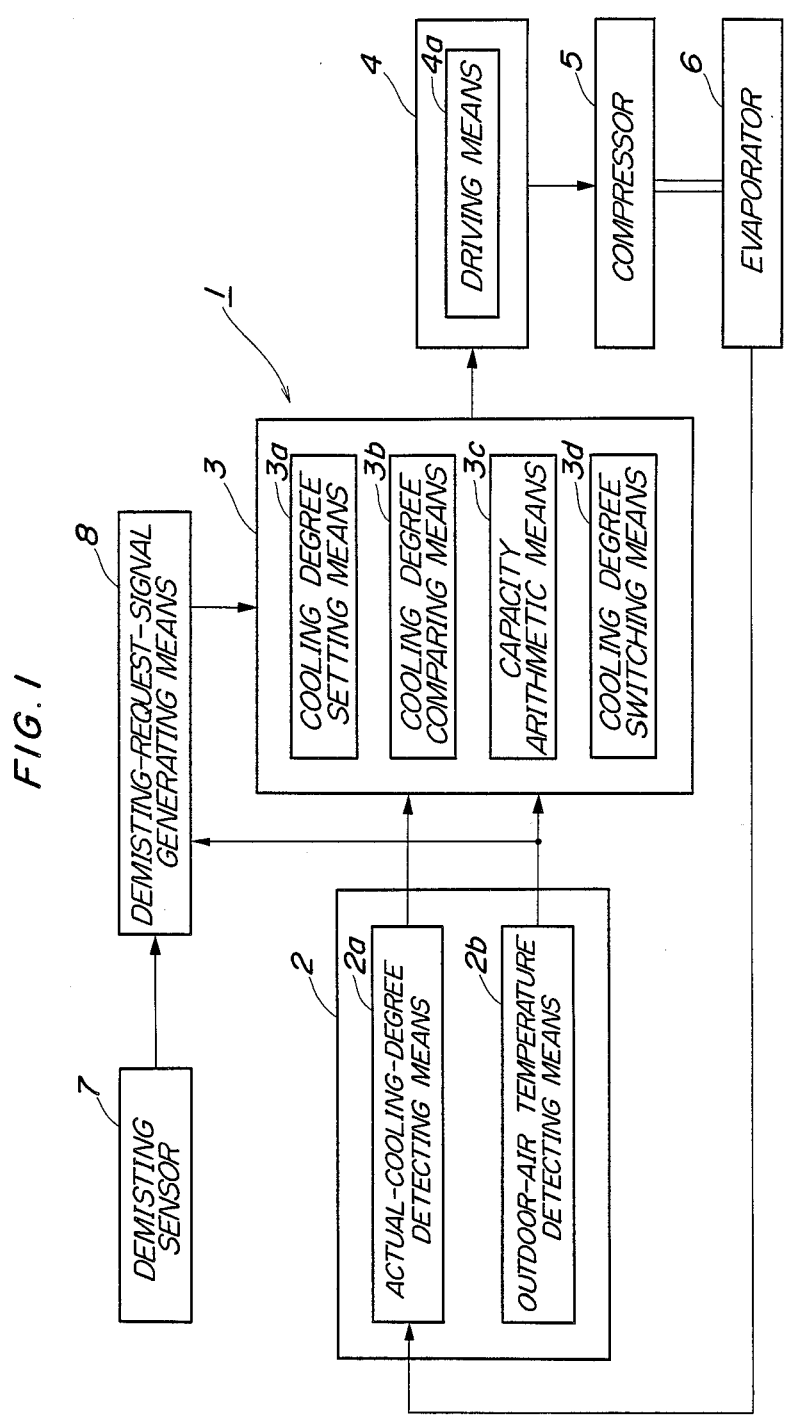
FIG. 1 is a block diagram showing the entire arrangement of a demisting control system according to a first embodiment of the invention.

A first embodiment of the invention will first be described with reference to FIGS. 1 through 3. FIG. 1 shows the entire arrangement of a demisting control system of an air conditioner for automotive vehicles, according to the first embodiment. The demisting control system comprises a control unit 1 which comprises an input section 2, an arithmetic section 3, and an output section 4.

The input section 2 is provided with actual-cooling-degree detecting means 2a for detecting the temperature T of refrigerant on the refrigerant inflow side of an evaporator 6 or of fins, tubes or the like constituting the evaporator 6, as the actual cooling degree of the evaporator 6 which cooperates with a compressor 5, etc. to constitute a refrigerating circuit. The input section 2 is further provided with outdoor-air temperature detecting means 2b for detecting ambient or outdoor air temperature $T_{AM}$.

The arithmetic section 3 is provided with desired-cooling-degree setting means 3a, cooling-degree comparing means 3b, capacity arithmetic means 3c, and desired-cooling-degree switching means 3d.

The desired-cooling-degree setting means 3a is designed to set two desired cooling degrees of the evaporator 6, which determine desired values of the capacity of the compressor 5 of variable capacity type capable of being controlled from the outside. These first and second desired cooling degrees have correlation to the outdoor air temperature $T_{AM}$ detected by the outdoor-air temperature detecting means 2b. In the present embodiment, the first and second cooling degrees are represented respectively by desired values $T_1$ and $T_2$ of the above-mentioned evaporator temperature T. Specifically, the desired values $T_1$ and $T_2$ are determined by the following equations:

$$T_1 T_{-AM-\alpha} \tag{1}$$

$$T_2 T =_1 + \beta \tag{2}$$

In the above equation (1), $\alpha$ is a constant. The outdoor air having the temperature $T_{AM}$ is cooled by the air conditioner, is introduced into the vehicle compartment and is blown against a front window pane, whereby mist is removed from the window pane. The constant $\alpha$ is set at the minimum possible value (4° C., for example) of the difference between the temperature of air blown against the front window pane and the outdoor air temperature $T_{AM}$, in order to enable the mist to be removed from the window pane in a short period of time as well as to obtain power-saving of the compressor. In the above equation (2), $\beta$ is also a constant, and is set at such a value (20° C., for example) as to cause the variable capacity compressor 5 to be operated at a minimum capacity when the first desired evaporator temperature $T_1$ assumes the minimum value that can be assumed thereby.

The cooling-degree comparing means 3d is designed to compare the actual evaporator temperature T detected by the actual-cooling-degree detecting means 2a and the first and second desired evaporator temperatures $T_1$ and $T_2$ set by the desired-cooling-degree setting means 3a to obtain differences between the actual evaporator temperature T and the respective first and second desired evaporator temperatures $T_1$ and $T_2$.

The capacity arithmetic means 3c is designed to calculate, on the basis of the comparison results or difference $T-T_1$ or $T-T_2$ of the cooling-degree comparing means 3b, the capacity to which the compressor 5 should be controlled, by the use of a predetermined equation (equation proportionally integrating the difference between T and $T_1$ or $T_2$, for example). Alternatively, the capacity arithmetic means 3c is arranged to read out, on the basis of the comparison results or difference, the capacity to which the compressor 5 should be controlled, from a table stored in memory means (not shown) incorporated in the arithmetic section 3.

The desired-cooling-degree switching means 3d is designed to select alternately the first and second desired evaporator temperatures $T_1$ and $T_2$ in such a manner that the capacity of the compressor 5 is controlled on the basis of the first and second desired evaporator temperatures $T_1$ and $T_2$ of the evaporator 6, respectively for two time periods $TM_1$ and $TM_2$ which are different from each other and which are clocked respectively by two timers. Specifically, the switching means 3d selects alternately the first and second evaporator temperatures $T_1$, $T_2$ and supplies the selected $T_1$ and $T_2$ to the comparing means 3b for the respective predetermined time periods $TM_1$ and $TM_2$.

The detecting means 2a for detecting the actual evaporator temperature of the evaporator 6 and the outdoor-air temperature detecting means 2b are electrically connected to an input side of the arithmetic section 3 so that output signals from the respective detecting means 2a and 2b are inputted to the arithmetic section 3.

The output section 4 is provided with driving means 4a. The driving means 4a has an input side thereof electrically connected to an output side of the arithmetic section 3. A control signal outputted from the capacity arithmetic means 3c is inputted to the driving means 4a. Further, the driving means 4a has an output side thereof electrically connected to a capacity control mechanism section, not shown, of the variable capacity compressor 5 of externally controlled type in which the capacity is controlled on the basis of an external signal. The driving means 4a converts a control signal outputted from the capacity arithmetic means 3a of the arithmetic section 3, to capacity control current for driving the capacity of the compressor 5 such that the compressor capacity is brought to the capacity value calculated by the arithmetic means 3c. The capacity control current is supplied to the capacity control mechanism section of the compressor 5.

A demisting-request-signal generating means 8 is connected to the arithmetic section 3 of the demisting control system 1. Connected to the signal generating means 8 are an output of a demisting sensor 7 for detecting a demisting degree on the inner surface of the window pane, and an output of the outdoor-air temperature detecting means 2b. The demisting-request-signal generating means 8 generates a demisting request signal on the basis of the output from the demisting sensor 7 when mist exists on the inner surface of the window pane. The demisting-request-signal generating means 8 also generates the demisting-request signal on the basis of the output from the outdoor-air temperature detecting means 2b when the outdoor air temperature is within a predetermined range (+5° C. to −5° C., for example).

The demisting request signal from the demisting-request-signal generating means 8 is supplied to the arithmetic section 3.

The operation of the demisting control system of an air conditioner for automotive vehicles will next be described with reference to FIGS. 2 and 3.

Figure 2:
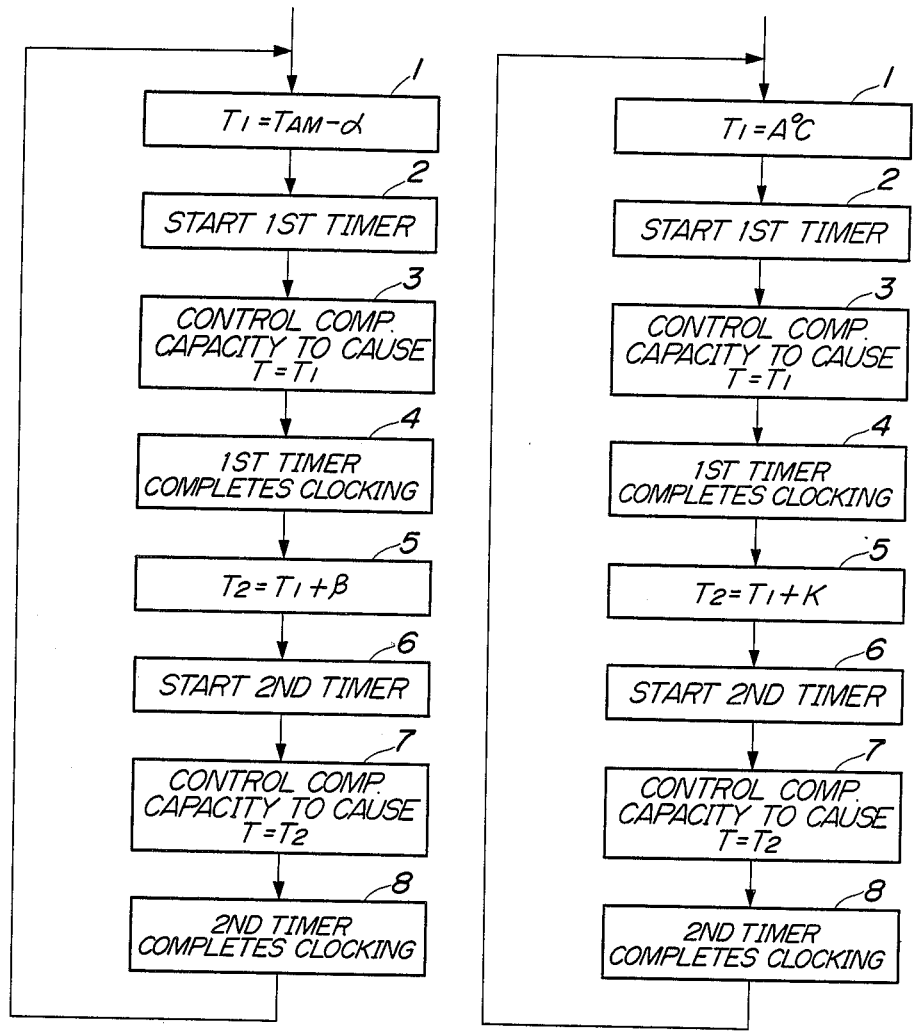
FIG. 2 is a flowchart showing the control steps executed by the system illustrated in FIG. 1.

FIG. 2 is a flowchart showing the operation of the demisting control system according to the invention. The demisting control is particularly required when the outdoor air temperature is lower than a lowest value above which the air conditioner should carry out its cooling operation, and at the same time the indoor air temperature is higher than the outdoor air temperature. On the other hand, the demisting control is not required during cooling operation of the air conditioner, because no mist will then occur on the inner surface of the window pane due to the dehumidifying function of the air conditioner. Accordingly, the demisting control is carried out when the air conditioner does not execute the cooling operation. The program represented by the flowchart shown in FIG. 2 is started when the demisting-request signal outputted from the demisting-request-signal generating means 8 is inputted to the arithmetic section 3 of the control system 1. The program shown in FIG. 2 is carried out repeatedly as long as the demisting request-signal is inputted.

The arithmetic section 3 first reads out the outdoor air temperature $T_{AM}$ detected by the outdoor-air temperature detecting means 2b. The arithmetic section 3 calculates a value by subtracting the constant $\alpha(4°$ C., for example) from the outdoor air temperature $T_{AM}$, that is, the equation $(T_{AM}-\alpha)$. The arithmetic section 3 sets the calculated value or difference $(T_{AM}-\alpha)$ as the first desired evaporator temperature $T_1$ or desired cooling degree of the evaporator 6 (step 1). At the same time, the arithmetic section 3 starts the first timer to clock the first time period $TM_1$ (5 minutes, for example) (step 2). Subsequently, at a step 3, the arithmetic section 3 carries out the capacity control of the compressor 5 in accordance with the difference between T and $T_1$ so as to make the actual evaporator temperature T of the evaporator 6 equal to the first desired evaporator temperature $T_1$ set at the step 1. It is possible to carry out demisting even when the air conditioner is in the outdoor-air introducing mode, because it is set that $T_1 = T_{AM}-\alpha$. Continuation of this demisting control for a long period of time will cause the evaporator 6 to freeze, if the outdoor air temperature is low. To prevent this, according to the invention, if the first timer started at the step 2 completes its clocking of the first time period $TM_1$, in other words, when the first time period $TM_1$ has elapsed (step 4), the desired evaporator temperature of the evaporator 6 is set to a value higher than the first value $T_1$ set at the step 1, that is, to the second desired evaporator temperature $T_2 (=T_1+\beta)$ obtained by adding the constant $\beta(20°$ C., for example) higher than the constant $\alpha$ to the first value $T_1$ (step 5). At the same time, the second timer is started which clocks the second time period $TM_2$ (3 minutes, for example) different from the first time period $TM_1$ at the step 2 (step 6). Capacity control of the compressor 5 is carried out at a step 7 in such a manner that the actual evaporator temperature T of the evaporator 6 is made equal to the second desired evaporator temperature $T_2$ set at the step 5. As a result, the compressor 5 is operated with a capacity smaller than that at the first desired evaporator temperature $T_1$. After this, when the second timer started at the step 6 completes its clocking of the second time period $TM_2$, that is, when the second time period $TM_2$ has elapsed (step 8), the program is again returned to the step 1. Thereafter, the above-described operations are repeated so long as the demisting-request signal is inputted. When the desired evaporator temperature or cooling degree is switched from the second desired evaporator temperature $T_2$ to the first one $T_1$, the capacity of the compressor 5 increases, so that oil is returned in large quantities from the refrigerating circuit of the air conditioner into the compressor 5. Thus, the oil return ability is enhanced. The constant $\beta$ may be set to a value proportional to the outdoor air temperature.

Figure 3:
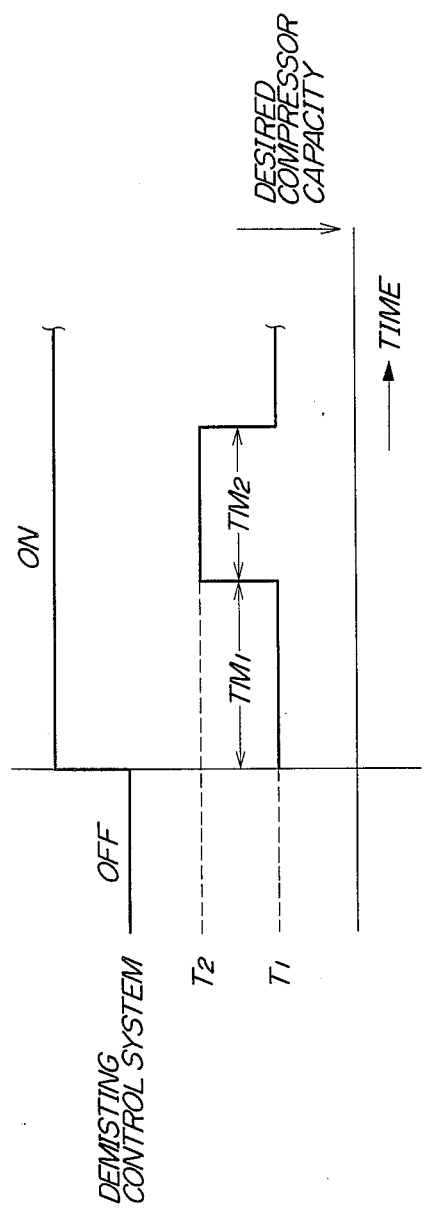
FIG. 3 is a timing chart related to the control steps illustrated in FIG. 2.

FIG. 3 is a timing chart showing the relationship between the desired capacity of the compressor and the time periods $TM_1$ and $TM_2$, applied when the demisting control is carried out. In FIG. 3, demisting is effected for the first time period $TM_1$. On the other hand, if the outdoor air temperature is extremely low so that the evaporator 6 freezes, thawing of the evaporator 6 is effected for the second time period $TM_2$.

In the embodiment illustrated in FIGS. 1 through 3, since $\alpha$ is set at the minimum possible value, the first desired evaporator temperature $T_1$ can be set to the maximum value that is possible insofar as required demisting ability is secured. Therefore, it is possible to achieve power-saving more efficiently, in particular, when the outdoor air having an intermediate temperature is introduced to carry out demisting, as compared with the method in which the first desired evaporator temperature $T_1$ is fixed at a low value.

FIG. 4 is a flowchart similar to FIG. 2, but showing the operation of a second embodiment of the invention. In FIG. 4, steps corresponding to those illustrated in FIG. 2 showing the operation of the above-described first embodiment are designated by identical reference numerals. The second embodiment is distinguished from the first embodiment only in that the first desired evaporator temperature $T_1$ of the evaporator 6 set at the step 1 is set at an upper limit temperature A ° C. [0 (zero) ° C., for example] at and below which the evaporator 6 may freeze, and that the second desired evaporator temperature $T_2$ set at the step 5 is set at a vlaue $(T_1+K)$ where K is a positive constant.

In the second embodiment, the compressor 5 is operated while alternately switching between the desired evaporator temperatures of the evaporator 6 set at fixed values regardless of the outdoor air temperature. Accordingly, if the first desired evaporator temperature $T_1$ is set at 0 (zero) ° C., the evaporator 6 will not freeze even when the outdoor air temperature is in the vicinity of 0 ° C.

Although in each of the above embodiments there are provided two desired cooling degrees and, correspondingly, there are two timers, it is to be understood that the invention is not limited to this specific form, but more than two desired cooling degrees and, correspondingly, more than two timers may be provided. For example, in addition to a first desired cooling degree intended for demisting and a second desired cooling degree $T_2$ intended for the minimum capacity operation of the compressor for the purpose of power-saving thereof, it is possible to set a third desired cooling degree which is an intermediate value between the first and second desired cooling degrees and which is intended for thawing of the evaporator, and to set other appropriate cooling degrees, according to necessity.

As will be clear from the foregoing description, the arrangement of the invention is such that the operation of the compressor is controlled on the basis of the cooling degree of the evaporator to carry out demisting. With such arrangement, the evaporator is prevented from freezing if the first desired cooling degree is set to a value equal to or lower than a value corresponding to 0 (zero) ° C. of evaporator temperature T. Even in the case where the first desired cooling degree $T_1$ is set to a value equal to or higher than a value corresponding to 0° C. of evaporator temperature T for the reason that the outdoor air temperature $T_{AM}$ is low, freezing of the evaporator can be restrained as far as possible.

Further, the arrangement of the invention is such that the desired cooling degree is switched between two or more values. With such arrangement, even if the compressor capacity is brought to a low value during the second time period $TM_2$, switching is made so as to increase the capacity of the compressor in response to expiration of the second time period. Thus, the oil-return ability to the compressor is enhanced, making it possible to improve the reliability of the compressor.

Moreover, the switching cycle may be set to any long cycle by the desired-cooling-degree switching means, thereby obtaining more excellent feeling as compared with the case where the operation state of the compressor fluctuates frequently.

Furthermore, as will be learned from the foregoing description, the desired cooling degree of the evaporator can optionally be set to any suitable values, which makes it possible to increase the degree of freedom of system design.

In addition, within a range of the outdoor air temperature at which mist generally tends to occur on the inner surface of a window pane of automotive vehicles, for example, +5° C. to −5° C., it has been difficult for the conventional air conditioner in which the compressor is controlled in an ON- and OFF-manner, to demist the window pane. The invention, however, carries out demisting control regardless of detection of mist on the window pane, thereby making it possible to ensure that the mist on the window pane is removed over a wide range of outdoor air temperature including the above range.

What is claimed is:

1. A demisting control system of an air conditioner for an automotive vehicle, said air conditioner including an evaporator, and a variable capacity compressor capable of being controlled in capacity by an external signal, said demisting control system comprising:

detecting means for detecting an actual cooling degree of said evaporator;
   setting means for setting at least two desired cooling degrees of said evaporator;
   comparing means for comparing the actual cooling degree detected by said detecting means with each of said at least two desired cooling degrees set by said setting means, to output comparison results;
   determining means for determining a value of capacity to which said compressor is to be controlled, on the basis of the comparison results from said comparing means;
   capacity switching means for selecting one by one said at least two desired cooling degrees in predetermined sequence and supplying each of the selected cooling degrees to said comparing means for a predetermined time period exclusively provided for the each selected cooling degree; and
   driving means for driving said compressor by said external signal so that the capacity thereof is brought to said value of capacity determined by said determined means.

2. A system according to claim 1, wherein at least one of said at least two desired cooling degrees is determined on the basis of outdoor air temperature.

3. A system according to claim 1 or claim 2, wherein said at least two desired cooling degrees comprise a first desired evaporator temperature $T_1$, and a second evaporator temperature $T_2$ having a value higher than said first evaporator temperature $T_1$, said first desired evaporator temperature $T_1$ being expressed by the following equation:

$$T_1 = T_{AM} - \alpha$$

where $T_{AM}$ is outdoor air temperature, and $\alpha$ is a constant that is a minimum value of a difference between temperature of air blown against at least one window pane of the automotive vehicle and said outdoor air temperature, in order to enable mist on an inner surface of the at least one window pane to be removed in a short period of time as well as to obtain power-saving of the compressor.

4. A system according to claim 3, wherein said second desired evaporator temperature $T_2$ is expressed by the following equation:

$$T_2 = T_1 + \beta$$

wherein $\beta$ is a constant set at such a value as to cause said compressor to be operated at the minimum capacity when said first desired evaporator temperature $T_1$ represents the minimum value that can be assumed thereby.

5. A system according to claim 1, wherein each of said at least two desired cooling degrees is a fixed value.

6. A system according to claim 1 or claim 5, wherein the maximum one of said at least two desired cooling degrees is set at a value corresponding to an upper limit temperature of said evaporator at and below which said evaporator may freeze.

* * * * *